United States Patent
Iwata et al.

(10) Patent No.: US 7,560,158 B2
(45) Date of Patent: Jul. 14, 2009

(54) ANTI-DAZZLING FILM

(75) Inventors: Yukimitsu Iwata, Shinjuku-ku (JP);
Hidetake Miyazaki, Shinjuku-ku (JP);
Tomoyuki Maekawa, Shinjuku-ku (JP);
Seiji Shinohara, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/606,276

(22) Filed: Jun. 26, 2003

(65) Prior Publication Data

US 2004/0053043 A1  Mar. 18, 2004

(30) Foreign Application Priority Data

Jun. 28, 2002  (JP) .............................. 2002-189383

(51) Int. Cl.
*B32B 5/16* (2006.01)
*B32B 27/00* (2006.01)
*B32B 27/08* (2006.01)
*G02B 27/00* (2006.01)

(52) U.S. Cl. ...................... 428/323; 428/327; 428/500; 428/515; 359/601

(58) Field of Classification Search ................. 428/323, 428/327, 500, 515
See application file for complete search history.

(56) References Cited

U.S. PATENT DOCUMENTS 6,217,176 B1 * 4/2001 Maekawa ................... 359/601

FOREIGN PATENT DOCUMENTS

| JP | A-9-304603 | 11/1997 |
|---|---|---|
| JP | 10-20103 | 1/1998 |
| JP | A-2000-338310 | 12/2000 |
| JP | A-2002-267814 | 9/2002 |

* cited by examiner

*Primary Examiner*—Sheeba Ahmed
(74) *Attorney, Agent, or Firm*—Oliff & Berridge, PLC

(57) ABSTRACT

Disclosed is an anti-dazzling film which, when provided on the surface of a display, can prevent the dazzle of the display caused by reflection of light introduced through a window, light emitted from room lighting equipment, etc. with high efficiency and, at the same time, can suppress whitening and scintillation in the surface of the display. The anti-dazzling film comprises a transparent substrate film and an anti-dazzling layer provided on one side of the transparent substrate film. The anti-dazzling layer is a layer which has been formed from at least an ionizing radiation-curable resin and transparent fine particles. The transparent fine particles satisfy requirements represented by formulae (I) and (II): $2.0\ \mu m \leq d50\% \leq 5.0\ \mu m$ (I) and $0.5\ \mu m \leq (d84\% - d16\%)/2 \leq 1.2\ \mu m$ (II) wherein d84% represents a particle diameter corresponding to a point of 84% in a cumulative curve of a particle size distribution assuming that the total weight of the transparent fine particles is 100%; d50% represents a particle diameter corresponding to a point of 50% in the cumulative curve of a particle size distribution; and d16% represents a particle diameter corresponding to a point of 16% in the cumulative curve of a particle size distribution.

3 Claims, 1 Drawing Sheet

ANTI-DAZZLING FILM

BACKGROUND OF THE INVENTION

1. Field of the Invention

The present invention relates to an anti-dazzling film to be provided on the surface of displays such as CRTs and liquid crystal panels.

2. Background Art

In a display, an anti-dazzling film is provided on the surface thereof. The anti-dazzling film diffuses light emitted from the inside of the display to some extent and reduces the dazzle level of screen at the time of visual observation of the surface of the display by a viewer and, further, the dazzle level of the screen caused by a catch of an image of a window, room lighting equipment or the like on the screen. As a result, the visibility of image information displayed on the screen of the display can be improved.

A conventional anti-dazzling film comprises an anti-dazzling layer containing fine particles such as silica or resin beads. An anti-dazzling film using resin beads having a large particle diameter (more than 5.0 μm) can satisfactorily prevent a whitening phenomenon in the surface of the film and the dazzle of screen caused by a catch of an image of a window, room lighting equipment or the like on the screen, but on the other hand, shining called "scintillation" occurs on the film surface, disadvantageously often posing a problem of deteriorated visibility of displayed image information. On the other hand, an anti-dazzling film using resin beads (less than 2.0 μm) having a small particle diameter can prevent scintillation, but on the other hand, a whitening phenomenon occurs on the surface of the film and optical properties such as resolution, contrast, and transparency are sometimes deteriorated.

To overcome the above problems, Japanese Patent Laid-Open No. 20103/1998 has proposed an anti-dazzling film provided with an anti-dazzling layer containing 20 to 30 parts by weight, based on 100 parts by weight of a curable resin, of transparent fine particles having an average particle diameter of 0.5 to 1.5 μm.

Up to now, however, any anti-dazzling film containing transparent fine particles having a specific particle size distribution has not been developed.

SUMMARY OF THE INVENTION

The present inventors have now found that the incorporation of transparent fine particles having a specific particle size distribution can provide an anti-dazzling film which can significantly reduce the dazzle of screen caused by a catch of an image of a window, room lighting equipment or the like on the screen and, at the same time, can effectively suppress whitening of the surface of the display and scintillation.

Accordingly, an object of the present invention is to provide an anti-dazzling film which can prevent the dazzle of the surface of a display and can realize excellent image reproduction.

Thus, according to the present invention, there is provided an anti-dazzling film comprising a transparent substrate film and an anti-dazzling layer provided on one side of the transparent substrate film, said anti-dazzling layer being a layer which has been formed from at least an ionizing radiation-curable resin and transparent fine particles, said transparent fine particles satisfying requirements represented by formulae (I) and (II):

$$2.0\ \mu m \leq d50\% \leq 5.0\ \mu m \quad (I)$$

$$0.5\ \mu m \leq (d84\% - d16\%)/2 \leq 1.2\ \mu m \quad (II)$$

wherein d84% represents a particle diameter corresponding to a point of 84% in a cumulative curve of a particle size distribution assuming that the total weight of the transparent fine particles is 100%; d50% represents a particle diameter corresponding to a point of 50% in said cumulative curve of a particle size distribution; and d16% represents a particle diameter corresponding to a point of 16% in said cumulative curve of a particle size distribution.

In the anti-dazzling film of the present invention, the anti-dazzling layer has excellent heat resistance, solvent resistance, scratch resistance, and strength. Further, the anti-dazzling film is excellent in the capability of preventing the dazzle of screen caused by a catch of an image of room lighting equipment or the like on the screen, and, in addition, the whitening of the surface of the film and the scintillation can be satisfactorily suppressed.

DESCRIPTION OF REFERENCE CHARACTERS IN THE DRAWINGS

1: anti-dazzling film, 10: transparent substrate film, and 20: anti-dazzling layer.

DETAILED DESCRIPTION OF THE INVENTION

Embodiment of the Invention

The anti-dazzling film in a first embodiment of the present invention comprises a transparent substrate film and an anti-dazzling layer provided on one side of the transparent substrate film, said anti-dazzling layer having been formed from at least a transparent fine particle-containing ionizing radiation-curable resin, said transparent fine particles satisfying requirements represented by formulae (I) and (II):

$$2.0\ \mu m \leq d50\% \leq 5.0\ \mu m \quad (I)$$

$$0.5\ \mu m \leq (d84\% - d16\%)/2 \leq 1.2\ \mu m \quad (II)$$

wherein d84% represents a particle diameter corresponding to a point of 84% in a cumulative curve of a particle size distribution assuming that the total weight of the transparent fine particles is 100%; d50% represents a particle diameter corresponding to a point of 50% in said cumulative curve of a particle size distribution; and d16% represents a particle diameter corresponding to a point of 16% in said cumulative curve of a particle size distribution.

The anti-dazzling film in a second embodiment of the present invention comprises a transparent substrate film and an anti-dazzling layer provided on one side of the transparent substrate film, said anti-dazzling layer having been formed from at least a transparent fine particle-containing ionizing radiation-curable resin, said transparent fine particles satisfying requirements represented by formulae (III) and (IV):

$$3.5 \ \mu m \leqq d50\% \leqq 5.0 \ \mu m \quad (III)$$

$$0.8 \ \mu m \leqq (d84\% - d16\%)/2 \leqq 1.0 \ \mu m \quad (IV)$$

wherein d84% represents a particle diameter corresponding to a point of 84% in a cumulative curve of a particle size distribution assuming that the total weight of the transparent fine particles is 100%; d50% represents a particle diameter corresponding to a point of 50% in said cumulative curve of a particle size distribution; and d16% represents a particle diameter corresponding to a point of 16% in said cumulative curve of a particle size distribution.

The anti-dazzling film in a third embodiment of the present invention is that two or more types of transparent fine particles are used as the transparent fine particles.

The anti-dazzling film in a fourth embodiment of the present invention is that the ionizing radiation-curable resin comprises a polyfunctional acrylate monomer.

Anti-dazzling Film

Figure 1:
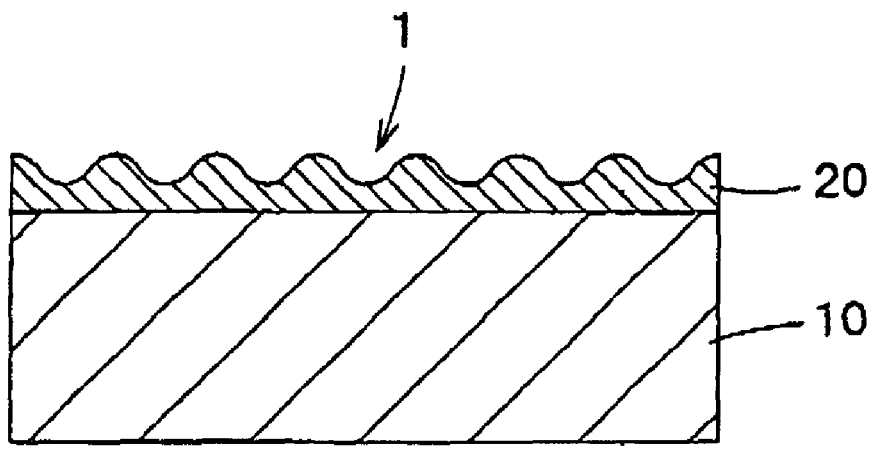
FIG. 1 is a schematic diagram showing an embodiment of the anti-dazzling film according to the present invention.

The anti-dazzling film according to the present invention will be described with reference to FIG. 1. FIG. 1 is a diagram showing the layer construction of the anti-dazzling film according to the present invention. An anti-dazzling film 1 comprises a transparent substrate film 10 and, provided on one side of the substrate film 10, an anti-dazzling layer 20 formed from an ionizing radiation-curable resin containing transparent fine particles (not shown).

In the present invention, the transparent fine particles satisfy requirements represented by formulae (I) and (II):

$$2.0 \ \mu m \leqq d50\% \leqq 5.0 \ \mu m \quad (I)$$

$$0.5 \ \mu m \leqq (d84\% - d16\%)/2 \leqq 1.2 \ \mu m \quad (II)$$

wherein d84% represents a particle diameter corresponding to a point of 84% in a cumulative curve of a particle size distribution assuming that the total weight of the transparent fine particles is 100%; d50% represents a particle diameter corresponding to a point of 50% in said cumulative curve of a particle size distribution; and d16% represents a particle diameter corresponding to a point of 16% in said cumulative curve of a particle size distribution.

In a preferred embodiment of the present invention, a requirement represented by formula (III) is used instead of the requirement represented by formula (I), and a requirement represented by formula (IV) is used instead of the requirement represented by formula (II).

$$3.5 \ \mu m \leqq d50\% \leqq 5.0 \ \mu m \quad (III)$$

$$0.8 \ \mu m \leqq (d84\% - d16\%)/2 \leqq 1.0 \ \mu m \quad (IV)$$

According to the present invention, the use of transparent fine particles with diameters satisfying the above formulae, that is, transparent fine particles with a relatively broad range of diameters, can reduce the amount of the transparent fine particles added and, at the same time, can suppress the dazzle of screen caused by a catch of an image of room lighting equipment or the like and the whitening of and scintillation on the surface of the film.

a) Transparent Substrate Film

Not only physical, mechanical, and chemical strength but also transparency is required of the transparent substrate film. Specific examples of transparent substrate films according to the present invention include stretched films or monoaxially or biaxially stretched films of polyethylene terephthalate, polybutylene terephthalate, polyamides (nylon-6, nylon-66, etc.), triacetylcellulose, polystyrene, polyallylate, polycarbonate, polyvinyl chloride, polymethylpentene, polyethersulfone, polymethyl methacrylate and the like. These films may have a single-layer structure or alternatively may have a multilayer structure of two or more layers. The thickness of the transparent substrate film is suitably 10 to 100 µm, for example, from the viewpoint of suitability for post-fabrication and cost.

b) Ionizing Radiation-curable Resin

The anti-dazzling layer according to the present invention has been formed from a resin, which, upon exposure to ultraviolet light or electron beams, can cause a crosslinking polymerization reaction and consequently can be brought to a three-dimensional polymeric structure, that is, an ionizing radiation-curable resin prepared by properly mixing reactive prepolymer, oligomer, and/or monomer, having a polymerizable unsaturated bond or an epoxy group in the molecule thereof, together.

Specific examples of ionizing radiation-curable resins include those containing acrylate functional groups. When hardness, heat resistance, solvent resistance, and scratch resistance of coatings are taken into consideration, structures having high crosslinking density are preferred. Particularly preferred are bifunctional or higher acrylate monomers. Specific examples of bifunctional or higher acrylate monomers include ethylene glycol di(meth)acrylate, 1,6-hexanediol diacrylate, trimethylolpropane tri(meth)acrylate, pentaerythritol tri(meth)acrylate, dipentaerythritol penta(meth)acrylate, and dipentaerythritol hexa(meth)acrylate. The term "(meth)acrylate" as used herein encompasses acrylate and/or methacrylate.

The ionizing radiation-curable resin can be satisfactorily cured by exposure to an electron beam. When ultraviolet light is applied for curing, however, photopolymerization initiators or photosensitizers may be used. Specific examples of photopolymerization initiators include acetophenones, benzophenones, thioxanthones, benzoins, benzoin methyl ether, Michler's benzoyl benzoate, Michler's ketone, diphenyl sulfide, dibenzyl disulfide, diethyl oxite, triphenylbiimidazole, and isopropyl-N,N-dimethylaminobenzoate. Specific examples of photosensitizers include n-butylamine, triethylamine, and tri-n-butylphosphine. These photopolymerization initiators and/or photosensitizers may be used solely or as a mixture of two or more. The amount of the photopolymerization initiator and/or the photosensitizer added may be about 0.1 to 10 parts by weight based on 100 parts by weight of the ionizing radiation-curable resin.

c) Transparent Fine Particles

The anti-dazzling layer according to the present invention comprises transparent fine particles. Specific examples of transparent fine particles include plastic beads, more specifically acrylic beads (refractive index 1.49), styrene-acryl copolymer beads (refractive index 1.54), melamine beads (refractive index 1.57), polycarbonate beads (refractive index 1.57), polyethylene beads (refractive index 1.50), polystyrene beads (refractive index 1.60), and polyvinyl chloride beads (refractive index 1.60). In use, one or two or more of the plastic beads may be selected.

In a preferred embodiment of the present invention, the transparent fine particles are different in refractive index from the ionizing radiation-curable resin by 0.02 to 0.20, because suitable light diffusing properties can be realized and scintillation can be suppressed.

Production Process of Anti-dazzling Film

The anti-dazzling film according to the present invention may be produced by forming an anti-dazzling layer on one side of a transparent substrate film. More specifically, the anti-dazzling film may be produced by providing a liquid resin composition of a transparent fine particle-containing ionizing radiation-curable resin, or a liquid resin composition prepared by optionally adding a thermoplastic resin, such as a urethane, polyester, acrylic, butyral, or vinyl resin, to the liquid resin composition of a transparent fine particle-containing ionizing radiation-curable resin, coating the liquid resin composition onto one side of a transparent substrate film by a well-known coating method such as roll coating, Mayer-bar coating, or gravure coating, and drying the coating to cure the coating. The coverage of the anti-dazzling layer is properly about 3 to 15 g/m² on a solid basis.

In a preferred embodiment of the present invention, a leveling agent, for example, a fluorine or silicone leveling agent, is added to the liquid resin composition. In the liquid resin composition with the leveling agent incorporated therein, upon coating or drying of the coating, the fluorine or silicone leveling agent is separated and deposited on the coating in its surface which constitutes an interface with the air and prevents the inhibition of curing by oxygen and further can impart, as a lubricant, anti-scratch effect to the anti-dazzling layer. The leveling agent is preferably used in a transparent substrate film (for example, a triacetylcellulose film) which has low heat resistance and thus cannot be exposed to ultraviolet light at enhanced irradiation intensity although optical properties are excellent.

Specific examples of ultraviolet light sources usable in curing the liquid resin composition include ultrahigh pressure mercury lamps, high pressure mercury lamps, low pressure mercury lamps, carbon arc lamps, blacklight fluorescent lamps, and metal halide lamps. The wavelength of the ultraviolet light may be in the range of 190 to 380 nm. Specific examples of electron beam sources include various electron beam accelerators, for example, Cockcroft-Walton, van de Graaff, resonance transformer, insulated core transformer, linear, dynamitron, and high-frequency electron beam accelerators.

Applications of Anti-dazzling Film

The anti-dazzling film according to the present invention is usable in polarizing plates and transmission displays. In use, the anti-dazzling film according to the present invention may be provided particularly on the surface of displays for high definition images, such as CRT and liquid crystal panels, used in image display in televisions, computers, word processors and the like.

EXAMPLES

The following various examples further illustrate the contents of the present invention but are not intended to limit the scope of the present invention.

Example 1

A coating liquid A, for anti-dazzling layer formation, having a composition specified in Table 1 was bar coated onto one side of an 80 μm-thick triacetylcellulose film. The coating was dried at 50° C. for one min. The dried coating was then cured by means of a UV exposure system [H-bulb (tradename), manufactured by Fusion UV Systems Japan KK] at an integrated quantity of light of 100 mj while maintaining the oxygen concentration at a value of not more than 0.1%. Thus, an anti-dazzling film provided with an about 5 μm-thick anti-dazzling layer was prepared.

TABLE 1

|  | Coating liquid A for anti-dazzling layer formation |
|---|---|
| Pentaerythritol triacrylate | 45 |
| Acrylic polymer | 5 |
| Irgacure 184 (tradename, manufactured by Ciba-Geigy Limited) (photopolymerization initiator) | 2 |
| Styrene-acryl copolymer beads (transparent fine particles) [d50% = 3.5 μm, (d84% − d16%)/2 = 0.95 μm] | 6 |
| Toluene | 35 |
| Cyclohexane | 15 |

Example 2

An anti-dazzling film was prepared in the same manner as in Example 1, except that the particle size distribution of the styrene-acryl copolymer beads was such that d50%=3.5 μm and (d84%−d16%)/2=1.2 μm.

Example 3

An anti-dazzling film was prepared in the same manner as in Example 1, except that the particle size distribution of the styrene-acryl copolymer beads was such that d50%=3.5 μm and (d84%−d16%)/2=0.5 μm.

Example 4

An anti-dazzling film was prepared in the same manner as in Example 1, except that the particle size distribution of the styrene-acryl copolymer beads was such that d50%=5.0 μm and (d84%−d16%)/2=1.0 μm.

Example 5

An anti-dazzling film was prepared in the same manner as in Example 1, except that the particle size distribution of the styrene-acryl copolymer beads was such that d50%=2.0 μm and (d84%−d16%)/2=0.8 μm.

Example 6

An anti-dazzling film was prepared in the same manner as in Example 1, except that the particle size distribution of the styrene-acryl copolymer beads was such that d50%=3.5 μm and (d84%−d16%)/2=1.0 μm.

Example 7

An anti-dazzling film was prepared in the same manner as in Example 1, except that the particle size distribution of the styrene-acryl copolymer beads was such that d50%=2.0 μm and (d84%−d16%)/2=1.0 μm.

Example 8

An anti-dazzling film was prepared in the same manner as in Example 1, except that the particle size distribution of the styrene-acryl copolymer beads was such that d50%=2.0 μm and (d84%−d16%)/2=0.5 μm.

Example 9

An anti-dazzling film was prepared in the same manner as in Example 1, except that the particle size distribution of the styrene-acryl copolymer beads was such that d50%=2.0 μm and (d84%−d16%)/2=1.2 μm.

Example 10

An anti-dazzling film was prepared in the same manner as in Example 1, except that the particle size distribution of the styrene-acryl copolymer beads was such that d50%=5.0 μm and (d84%–d16%)/2=0.5 μm.

Example 11

An anti-dazzling film was prepared in the same manner as in Example 1, except that the particle size distribution of the styrene-acryl copolymer beads was such that d50%=5.0 μm and (d84%–d16%)/2=1.2 μm.

Example 12

An anti-dazzling film was prepared in the same manner as in Example 1, except that the coating liquid A for anti-dazzling layer formation was changed to a coating liquid B, for anti-dazzling layer formation, having a composition specified in Table 2.

TABLE 2

| | Coating liquid B for anti-dazzling layer formation |
|---|---|
| Pentaerythritol triacrylate | 45 |
| Acrylic polymer | 5 |
| Irgacure 184 (tradename, manufactured by Ciba-Geigy Limited) (photopolymerization initiator) | 2 |
| Styrene-acryl copolymer beads (transparent fine particles) | 3 |
| Styrene beads (transparent fine particles) [d50% = 3.5 μm, (d84% – d16%)/2 = 0.9 μm] (Note 1) | 3 |
| Toluene | 35 |
| Cyclohexane | 15 |

*(Note 1): Particle size distribution after mixing of styrene-acryl copolymer beads with styrene beads

Comparative Example 1

An anti-dazzling film was prepared in the same manner as in Example 1, except that the particle size distribution of the styrene-acryl copolymer beads was such that d50%=3.5 μm and (d84%–d16%)/2=0.15 μm.

Comparative Example 2

An anti-dazzling film was prepared in the same manner as in Example 1, except that the particle size distribution of the styrene-acryl copolymer beads was such that d50%=7.0 μm and (d84%–d16%)/2=0.15 μm.

Comparative Example 3

An anti-dazzling film was prepared in the same manner as in Example 1, except that the particle size distribution of the styrene-acryl copolymer beads was such that d50%=1.0 μm and (d84%–d16%)/2=0.15 μm.

Comparative Example 4

An anti-dazzling film was prepared in the same manner as in Example 1, except that the particle size distribution of the styrene-acryl copolymer beads was such that d50%=1.0 μm and (d84%–d16%)/2=1.0 μm.

Comparative Example 5

An anti-dazzling film was prepared in the same manner as in Example 1, except that the particle size distribution of the styrene-acryl copolymer beads was such that d50%=7.0 μm and (d84%–d16%)/2=1.0 μm.

Comparative Example 6

An anti-dazzling film was prepared in the same manner as in Example 1, except that the coating liquid A for anti-dazzling layer formation was changed to a coating liquid C, for anti-dazzling layer formation, having a composition specified in Table 3.

TABLE 3

| | Coating liquid C for anti-dazzling layer formation |
|---|---|
| Pentaerythritol triacrylate | 45 |
| Acrylic polymer | 5 |
| Irgacure 184 (tradename, manufactured by Ciba-Geigy Limited) (photopolymerization initiator) | 2 |
| Styrene-acryl copolymer beads (transparent fine particles) [d50% = 3.5 μm, (d84% – d16%)/2 = 0.15 μm] | 10 |
| Toluene | 35 |
| Cyclohexane | 15 |

Comparative Example 7

An anti-dazzling film was prepared in the same manner as in Example 1, except that the coating liquid A for anti-dazzling layer formation was changed to a coating liquid D, for anti-dazzling layer formation, having a composition specified in Table 4.

TABLE 4

| | Coating liquid D for anti-dazzling layer formation |
|---|---|
| Pentaerythritol triacrylate | 45 |
| Acrylic polymer | 5 |
| Irgacure 184 (tradename, manufactured by Ciba-Geigy Limited) (photopolymerization initiator) | 2 |
| Styrene-acryl copolymer beads (transparent fine particles) [d50% = 7.0 μm, (d84% – d16%)/2 = 0.15 μm] | 15 |
| Toluene | 35 |
| Cyclohexane | 15 |

Comparative Example 8

An anti-dazzling film was prepared in the same manner as in Example 1, except that the coating liquid A for anti-dazzling layer formation was changed to a coating liquid E, for anti-dazzling layer formation, having a composition specified in Table 5.

TABLE 5

| | Coating liquid E for anti-dazzling layer formation |
|---|---|
| Pentaerythritol triacrylate | 45 |
| Acrylic polymer | 5 |
| Irgacure 184 (tradename, manufactured by Ciba-Geigy Limited) (photopolymerization initiator) | 2 |
| Styrene-acryl copolymer beads (transparent fine particles) [d50% = 1.0 μm, (d84% − d16%)/2 = 0.15 μm] | 20 |
| Toluene | 35 |
| Cyclohexane | 15 |

Comparative Example 9

An anti-dazzling film was prepared in the same manner as in Example 1, except that the particle size distribution of the styrene-acryl copolymer beads was such that d50%=3.5 μm and (d84%−d16%)/2=1.5 μm.

Comparative Example 10

An anti-dazzling film was prepared in the same manner as in Example 1, except that the particle size distribution of the styrene-acryl copolymer beads was such that d50%=3.5 μm and (d84%−d16%)/2=0.3 μm.

Evaluation Test

The anti-dazzling films of Examples 1 to 11 and Comparative Examples 1 to 10 were evaluated for an anti-dazzling property, a scintillation preventive property, and a whitening preventive property. The results are shown in Table 6.

(1) Evaluation for Anti-dazzling Property

Each of the anti-dazzling films of the above examples and comparative examples was laminated onto a black acrylic sheet through a transparent double face pressure-sensitive adhesive film, and light from a fluorescent lamp was then reflected from the surface of the anti-dazzling layer. In this case, the unsharpness of the contour of the image of the fluorescent lamp was visually inspected, and the anti-dazzling property level was determined based on the level of unsharpness, and the results were evaluated according to the following criteria.

Evaluation Criteria

⊚ (High level of unsharpness): very good anti-dazzling property x (Low level of unsharpness): poor anti-dazzling property ○ (Level between evaluation ⊚ and evaluation x): no practical problem (2) Evaluation for Scintillation Preventive Property A black matrix (pitch 150 μm) of staggered arrangement was disposed on a light box. Each of the anti-dazzling films of the examples and the comparative examples was put on top of the black matrix, and the assembly was visually inspected for scintillation. The scintillation preventive property level was determined based on the level of scintillation, and the results were evaluated according to the following criteria.

Evaluation Criteria

⊚+ (Very low level of scintillation): excellent anti-dazzling property

⊚ (Low level of scintillation): very good anti-dazzling property x (High level of scintillation): poor anti-dazzling property ○ (Level between evaluation ⊚ and evaluation x): no practical problem (3) Evaluation for Whitening Preventive Property Each of the anti-dazzling films of the examples and the comparative examples was laminated onto a black acrylic sheet through a transparent double face pressure-sensitive adhesive film. Light from a fluorescent lamp was applied to the surface of the anti-dazzling layer. In this case, the anti-dazzling layer was visually inspected for whitening, the whitening preventive property level was determined based on the level of whitening, and the results were evaluated according to the following criteria.

Evaluation Criteria

⊚ (Low level of whitening): very good anti-dazzling property x (High level of whitening): poor anti-dazzling property ○ (Level between evaluation ⊚ and evaluation x): no practical problem

TABLE 6

| | Anti-dazzling property | Scintillation preventive property | Whitening preventive property |
|---|---|---|---|
| Example 1 | ⊚ | ⊚ | ○ |
| Example 2 | ⊚ | ○ | ⊚ |
| Example 3 | ○ | ⊚ | ⊚ |
| Example 4 | ⊚ | ○ | ⊚ |
| Example 5 | ○ | ⊚ | ○ |
| Example 6 | ⊚ | ⊚ | ○ |
| Example 7 | ○ | ⊚ | ○ |
| Example 8 | ○ | ⊚ | ○ |
| Example 9 | ○ | ⊚ | ○ |
| Example 10 | ⊚ | ○ | ○ |
| Example 11 | ⊚ | ○ | ○ |
| Example 12 | ⊚ | ⊚+ | ○ |
| Comparative Example 1 | x | ⊚ | ○ |
| Comparative Example 2 | ⊚ | x | ○ |
| Comparative Example 3 | x | ○ | x |
| Comparative Example 4 | x | ○ | x |
| Comparative Example 5 | ⊚ | x | ○ |
| Comparative Example 6 | ○ | ⊚ | x |
| Comparative Example 7 | ⊚ | x | x |
| Comparative Example 8 | x | ⊚ | x |
| Comparative Example 9 | ○ | x | ○ |
| Comparative Example 10 | x | ⊚ | ○ |

Measurement of Particle Size Distribution

Figure 2:
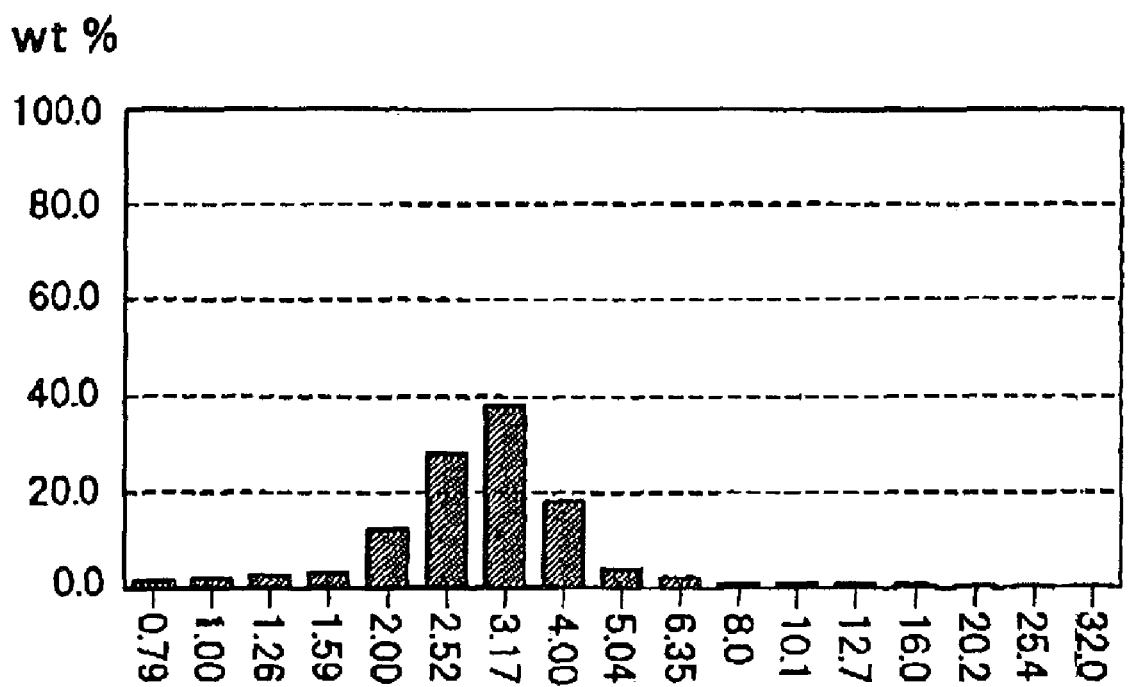
FIG. 2 is a diagram showing particle size distribution of transparent fine particles (beads used in Example 12).

The particle diameter of beads referred to herein was measured with Coulter Multisizer manufactured by Coulter. Data on the particle diameter of beads used in Example 12 are shown in Table 7, and the particle size distribution thereof is shown in FIG. 2. In this case, d50% was 3.5 μm, d84% 4.4 μm, and d16% 2.6 μm.

TABLE 7

| (Data on particle diameter) | | |
|---|---|---|
| Particle diameter | Differential | Cumulative |
| 0.79-1.00 | 0.0 | 100.0 |
| 1.00-1.26 | 0.4 | 100.0 |

TABLE 7-continued (Data on particle diameter)

| Particle diameter | Differential | Cumulative |
|---|---|---|
| 1.26-1.59 | 1.0 | 99.6 |
| 1.59-2.00 | 3.4 | 98.6 |
| 2.00-2.52 | 11.4 | 95.3 |
| 2.52-3.17 | 25.1 | 83.8 |
| 3.17-4.00 | 36.3 | 58.8 |
| 4.00-5.04 | 18.0 | 22.5 |
| 5.04-6.35 | 3.5 | 4.5 |
| 6.35-8.00 | 0.8 | 1.0 |
| 8.00-10.1 | 0.2 | 0.2 |
| 10.1-12.7 | 0.0 | 0.0 |
| 12.7-16.0 | 0.0 | 0.0 |
| 16.0-20.2 | 0.0 | 0.0 |
| 20.2-25.4 | 0.0 | 0.0 |
| 25.4-32.0 | 0.0 | 0.0 |

The invention claimed is:

1. An anti-dazzling film, comprising:

a transparent substrate film; and an anti-dazzling layer provided on one side of the transparent substrate film;

wherein:

the anti-dazzling layer comprises an ionizing radiation-curable resin, and transparent fine particles;

the transparent fine particles consist of a single type of transparent fine particles; and the transparent fine particles satisfy formulae (I) and (II):

$$2.0 \ \mu m \leq d50\% > 5.0 \ \mu m \quad (I)$$

$$0.5 \ \mu m \leq (d84\% - d16\%)/2 \leq 1.2 \ \mu m \quad (II)$$

where:

d84% represents a particle diameter corresponding to a point of 84% in a cumulative curve of a particle size distribution of the transparent fine particles, assuming that the total weight of the transparent fine particles is 100%;

d50% represents a particle diameter corresponding to a point of 50% in the cumulative curve of particle size distribution; and d16% represents a particle diameter corresponding to a point of 16% in the cumulative curve of particle size distribution.

2. The anti-dazzling film according to claim 1, wherein said ionizing radiation-curable resin comprises a polyfunctional acrylate monomer.

3. An anti-dazzling film, comprising:

a transparent substrate film; and an anti-dazzling layer provided on one side of the transparent substrate film;

wherein:

the anti-dazzling layer comprises an ionizing radiation-curable resin, and transparent fine particles;

the transparent fine particles consist of a single type of transparent fine particles; and the transparent fine particles satisfy formulae (III) and (IV):

$$3.5 \ \mu m \leq d50\% \leq 5.0 \ \mu m \quad (III)$$

$$0.8 \ \mu m \leq (d84\% - d16\%)/2 \leq 1.0 \ \mu m \quad (IV)$$

where:

d84% represents a particle diameter corresponding to a point of 84% in a cumulative curve of particle size distribution of the transparent fine particles, assuming that the total weight of the transparent fine particles is 100%;

d50% represents a particle diameter corresponding to a point of 50% in the cumulative curve of particle size distribution; and d16% represents a particle diameter corresponding to a point of 16% in the cumulative curve of particle size distribution.

* * * * *